(No Model.)

F. B. CARSON.
WAGON BRAKE.

No. 288,546. Patented Nov. 13, 1883.

WITNESSES
Chas. D. Davis
J. J. McCarthy

INVENTOR
F. B. Carson
By C. M. Alexander
Attorney

UNITED STATES PATENT OFFICE.

FRANCIS B. CARSON, OF STAUNTON, VIRGINIA.

WAGON-BRAKE.

SPECIFICATION forming part of Letters Patent No. 288,546, dated November 13, 1883.

Application filed August 21, 1883. (No model.)

*To all whom it may concern:*

Be it known that I, FRANCIS B. CARSON, a citizen of the United States, residing at Staunton, in the county of Augusta and State of Virginia, have invented certain new and useful Improvements in Wagon-Brakes, of which the following is a specification, reference being had therein to the accompanying drawings.

This invention relates to certain improvements in brakes for road-wagons of that class in which the driver rides upon one of the wheel horses; and it has for its objects to enable the driver to apply the brakes, when desired, without dismounting, as more fully hereinafter specified. These objects I attain by the means illustrated in the accompanying drawings, in which—

Figure 1:
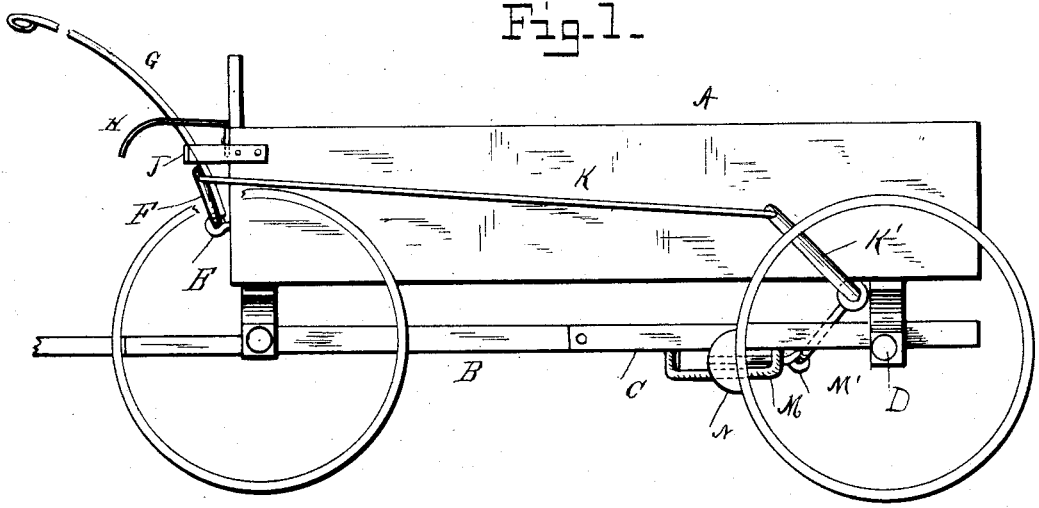
Figure 2:
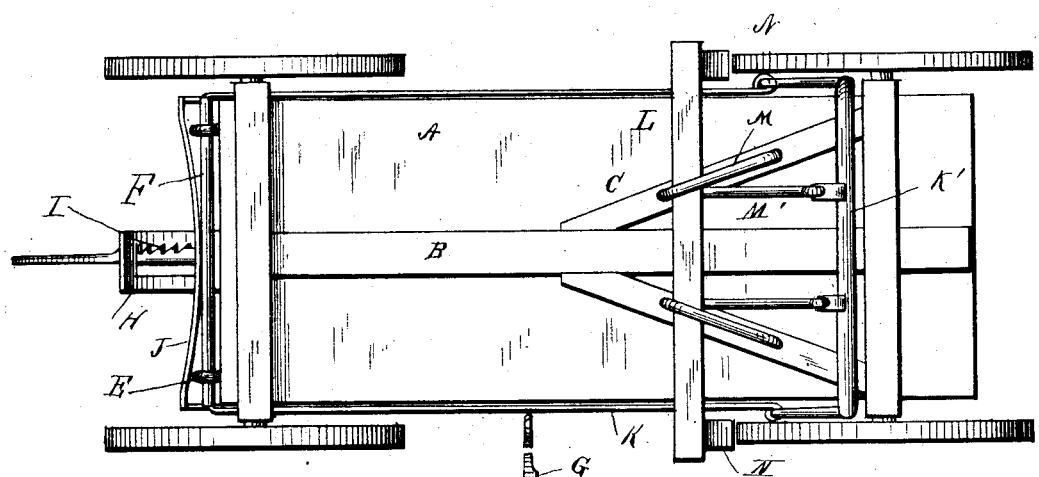
Figure 3:
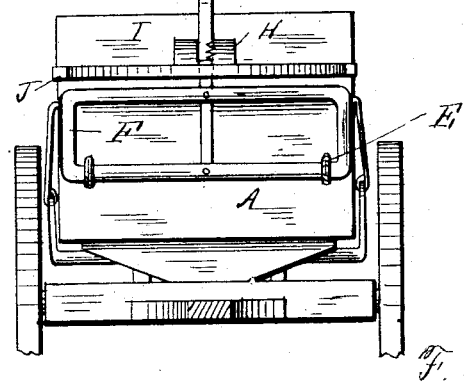

Figure 1 represents a side elevation of a wagon, showing my invention applied thereto; Fig. 2, a bottom view of the same, and Fig. 3 a front view.

The letter A indicates the body of the wagon, B the reach, C the hounds, and D the axles thereof.

To the forward axle is secured two bearings, E, in which is journaled the lower portion of a frame, F, which has attached or secured to it a lever, G, bent so as to extend forward within reach of the driver mounted upon one of the wheel horses. The front of the wagon is provided with a bracket, H, ratcheted at one side, as indicated by the letter I, the ratchets serving to engage and hold the lever when the brakes are applied.

The brake-frame before mentioned is connected by means of suitable rods, K, with a transverse lever, K′, which is connected to a brake-bar, L, which works in guides M (secured to the hounds or other portion of the wagon) by means of links M′. The said brake is provided with brake shoes or blocks N, which may be brought to bear upon the rear wheels by means of the mechanism before mentioned.

The operating-arm of the brake-lever may be made in two parts, so as to slide or telescope with each other in order that the lever may be shortened, so as to be out of the way when not in use.

In front of the brake-frame is located a spring, J, which holds and returns the frame to a normal position.

Having thus described my invention, what I claim, and desire to secure by Letters Patent, is—

The combination in a road-wagon, of the brake-frame pivoted to the forward part of the wagon and provided with a forwardly-extending bent arm, the transverse lever connected to the brake-frame by rods at each side, the brake-bar connected to said lever by means of suitable links and working in guides on the hounds or other portion of the wagon, the bar being provided with brake blocks or shoes adapted to bear against the wheels, substantially as and for the purposes specified.

In testimony whereof I affix my signature in presence of two witnesses.

FRANCIS B. CARSON.

Witnesses:
HARRY A. COLMAN,
CHAS. D. DAVIS.